(12) United States Patent
Pokharel

(10) Patent No.: US 10,846,419 B2
(45) Date of Patent: Nov. 24, 2020

(54) SERVICE FOR USERS TO VOLUNTARILY SELF-IDENTIFY IN OVER THE TOP (OTT) MESSAGING

(71) Applicant: salesforce.com, inc., San Francisco, CA (US)

(72) Inventor: Anurodh Pokharel, Brookline, MA (US)

(73) Assignee: salesforce.com, inc., San Francisco, CA (US)

( * ) Notice: Subject to any disclaimer, the term of this patent is extended or adjusted under 35 U.S.C. 154(b) by 215 days.

(21) Appl. No.: 15/955,624

(22) Filed: Apr. 17, 2018

(65) Prior Publication Data
US 2019/0318108 A1    Oct. 17, 2019

(51) Int. Cl.
| H04L 29/06 | (2006.01) |
| H04L 9/08  | (2006.01) |
| H04L 9/32  | (2006.01) |
| G06F 21/62 | (2013.01) |

(52) U.S. Cl.
CPC ........ *G06F 21/6218* (2013.01); *H04L 9/0866* (2013.01); *H04L 9/3213* (2013.01); *H04L 63/061* (2013.01); *H04L 63/102* (2013.01); *H04L 63/12* (2013.01)

(58) Field of Classification Search
CPC ..... H04L 63/102; H04L 63/12; H04L 9/0866; H04L 63/061; H04L 9/3213; G06F 21/6218; G06F 21/62
See application file for complete search history.

(56) References Cited

U.S. PATENT DOCUMENTS

| 7,730,478 B2 | 6/2010 | Weissman |
| 8,994,777 B2* | 3/2015 | Chazin ................ H04L 12/1831 348/14.06 |
| 2010/0199098 A1* | 8/2010 | King .................... G06F 21/6254 713/182 |
| 2016/0080559 A1* | 3/2016 | Mufti .................. H04L 65/4038 455/416 |
| 2016/0134599 A1* | 5/2016 | Ross ....................... H04L 63/08 713/168 |
| 2016/0142380 A1* | 5/2016 | Fuller ................. G06F 21/6254 726/9 |
| 2017/0265246 A1* | 9/2017 | De Kievit ............. H04W 76/14 |
| 2017/0364917 A1* | 12/2017 | Karantzis ........... G06Q 20/4016 |

* cited by examiner

*Primary Examiner* — Mohammad A Siddiqi
(74) *Attorney, Agent, or Firm* — Nicholson, De Vos, Webster & Elliott, LLP

(57) ABSTRACT

A method enables a user to self-identify to a user support system when a user electronic device is connected to the user support system by an over-the-top (OTT) communication session where an OTT messaging service provides an anonymous identifier to the user support system to enable communication with the user. The method includes receiving a secured real identifier and a secured token from the user electronic device in response to a user selection to self-identify to the user support system, decrypting the secured real identifier to determine a real identifier that identifies user account information at an external system, determining the anonymous identifier for the user using the secured token in a manner that associates the real identifier with the OTT communication session, and sending the real identifier to the user support system to enable access to the user account information by the user support system.

16 Claims, 7 Drawing Sheets

SERVICE FOR USERS TO VOLUNTARILY SELF-IDENTIFY IN OVER THE TOP (OTT) MESSAGING

TECHNICAL FIELD

One or more implementations relate to the field of over the top (OTT) messaging systems; and more specifically, to an identity service for enabling users to voluntarily provide user account information to a user support system.

BACKGROUND ART

An Over the Top (OTT) messaging service is a technology for electronic communication. The OTT messaging service does not rely on a short message system (SMS), but the communication is over a network (e.g., wireless and/or wired, local area and/or wide area) and thus relies on the provider (ISP or mobile) making network access possible. The OTT messaging service is accessed by a user via a local application (sometimes referred to as "an OTT messaging application") running on an electronic device. The local application running on the electronic device establishes an "OTT communication session" with an application running on another electronic device using the OTT messaging service, and OTT messages are communicated between them through the OTT communication session. For example, the user of an electronic device may seek to communicate with a user support system using the local application by sending OTT messages to and receiving OTT messages from the user support system through an OTT communication session provided by the OTT messaging service. The user can contact the user support system to make queries or access services of the user support system. For example, the user support system may include a user support staff and/or an automated support instance tasked with answering questions and/or offering services through the OTT messaging service session. In some cases, the user has questions related to an account they may have with an external system. The external system is external to the user support system at least in the sense that the user support system cannot access the user account information without determining a real identifier for a user account and in some cases authentication information (e.g., over the OTT communication session).

The process of providing user support staff with sufficient user account information to determine the real identifier for a user account with the external system is slow and can be an unsatisfying user experience. Further, the OTT communication session may not be secure. The user sends the user account identification information by text input into an OTT messaging application executed by the electronic device of the user. The OTT messaging application sends the input information to the OTT messaging service, which then forwards the input information to the user support system. If the user provides inaccurate information, e.g., with typographical errors, then the user support staff will not be able to access the user account information on the external system. The user support staff may have to repeatedly query the user via the OTT communication session to receive the correct user account identification information so the user account information can be successfully accessed.

If the OTT communication session is prematurely ended, then the process of obtaining the necessary information that is needed to identify the user account and to verify the user is associated with an account must be restarted. This further adds to the unsatisfactory user experience. The user support system cannot determine a real identifier for a user account without asking for authentication information to verify the identity of the user because OTT messaging services utilize anonymous identifiers for their users such that the user support system cannot automatically correlate or verify a user of the OTT messaging service.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for enabling a user to voluntarily identify a user account and enable access to user account information by a user support system. An identity service coordinates the secure correlation of an anonymous identifier from an over the top (OTT) communication session with a real identifier for a user account of an external system to enable the user support system to be given access to the user account information and thereby further assist the user via the OTT messaging service. In this process, the user maintains control over the release of the user account information of the external system to the user support system.

Figure 1:
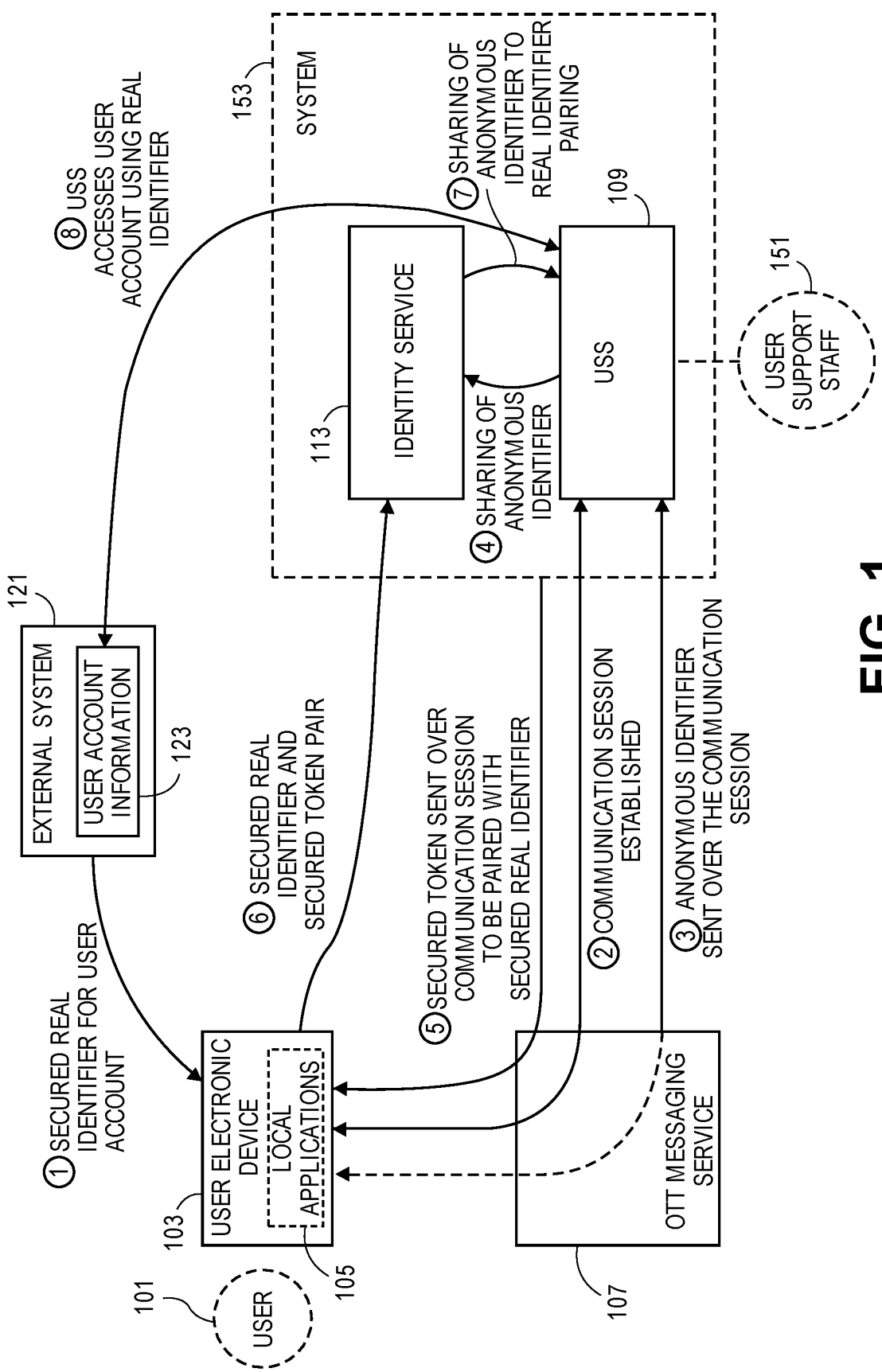
FIG. 1 is a diagram of an over the top (OTT) messaging service, external system, user electronic device, user support system and identity service according to some example implementations.

FIG. 1 is a diagram of an over the top (OTT) messaging service, external system, user electronic device, user support system, and identity service according to some example implementations.

The diagram illustrates the operation of a process whereby a user 101 is able to provide user account information 123 to the user support staff 151 and/or automated support instance via OTT messaging, which are referred to collectively as a "correspondent." A user electronic device 103 executes a set of local applications 105. A 'set,' as used herein refers to any positive whole number of items including one item. The user electronic device 103, as described in more detail below, can be any type of computing device including a mobile device, console device, laptop, desktop, or similar electronic device capable of executing local applications 105. The local applications 105 can include any application that enables communication with other messaging applications via a network without direct reliance on network service provider services such as short message service (SMS) other than those services the enable the access to the network itself. The local applications 105 can enable access to external system 121 services and enable communication with the user support system 109. The one or more local applications 105 that enable communication with the user support system 109 can communicate via an OTT messaging service 107 and may be referred to as OTT messaging applications.

The OTT messaging service 107 can be provided by a set of one or more electronic devices executing software as discussed later herein. The OTT messaging service 107 can facilitate routing and processing of OTT communications of the local application 105. The user 101 can have an account or profile with the OTT messaging service 107 in some implementations. In other implementations, the user 101 does not have an account or profile with the OTT messaging service 107 and is completely anonymous. The user 101 can be anonymous to the OTT messaging service 107 and have a per connection or session relationship with the OTT messaging service 107. In other implementations, the OTT messaging service 107 can maintain anonymity of the user 101 and user electronic device 103 by only sharing an anonymous identifier (ID) with other users or services. The user 101 can have an account or profile with the OTT messaging service 107 in some implementations. In such implementations, the OTT messaging service 107 can maintain anonymity of the user 101 and user electronic device 103 by only sharing an anonymous identifier with other users or services. The anonymous identifier enables the sending of OTT messages to the user 101 by addressing the destination OTT messages with the anonymous identifier. In other implementations, the user 101 does not have an account or profile with the OTT messaging service 107 and is completely anonymous.

In the illustrated example, the user 101 of the user electronic device 103 is communicating with a user support system 109 via the OTT messaging service 107. The user support system 109 can be any type of service that communicates with a user 101 over a OTT messaging service 107. The user support system 109 can be a customer relations management (CRM) service or similar system where a set of user support staff 151 and/or automated support instances associated with the user support system 109 can correspond via the OTT messaging service 107 with the user 101. The user support system 109 can be implemented by a set of one or more electronic devices executing software as discussed later herein. The user support staff 151 can be local to the user support system 109 or remote. For example, the user support staff 151 can be operating such that a pool of user support staff 151 is available to correspond with the user 101 as well as any number of additional users via the OTT messaging service 107. The user support system 109 manages and coordinates the assignment of user support staff 151 or similar correspondents with the users 101. In some implementations, the user support system 109 can execute artificial intelligence components or similar algorithms to partially or completely interact with the user 101 over the OTT communication session (each referred to herein as an automated support instance). A user 101 can initiate an OTT communication session with the user support system 109 via the OTT messaging service 107 by using a public address or handle of the user support system 109.

The user 101 also has a relationship with an external system 121 where the user 101 has a user account. The external system 121 can be implemented by a set of one or more electronic devices executing software as discussed later herein. The external system 121 can be operated by an entity with a relationship with the operator of the user support system 109 and/or an identity service 113 (in one implementation, both the user support system 109 and the identity service 113 are part of a same system 153 operated by a single entity with which this relationship exists). The external system 121 can provide any set of services to the user 101. In some implementations, the local applications 105 include an external system application associated with the external system 121 such that the external system 121 can communicate and provide services to the user 101 at the user electronic device 103. The user 101 can access the services of the external system 121 via the external system application, which is in communication with the external system 121 via a network connection. The external system 121 can provide a secured real identifier (also referred to herein as the "secured identifier" or "encrypted identifier") for the user account to the user 101 via the external system application. The secured real identifier is an identifier of the user account that has been protected by encryption or similar process to prevent improper use of the underlying real identifier to access the user account information 123 at the external system 121. The external system 121 can encrypt the real identifier (also referred to as "identifier" or "user account identifier") using any encryption process and can share encryption keys with other systems where a trusted relationship exists to enable those systems to decrypt the secured real identifier. In the example implementations, the user support system 109, the identity service 113, or the system 153 more generally can be provided the decryption keys or similar information to enable decryption of the secured real identifier and access to the user account information. The provision of the secured real identifier to the user electronic device 103 (see circled 1 in FIG. 1, where such circled numbers/letters are referred to herein using parenthesis—e.g., "(1)") and the keys are asynchronous to the other steps of the illustrated process and can occur at any point before pairing as discussed further herein below.

The OTT communication session between the user 101 and user support system 109 can be initiated by the user 101 opening an OTT messaging application of the local applications 105, which is executed by the user electronic device 103. The user 101 can enter an address, handle, or similar identifier (sometimes referred to here as a USS identifier) for the user support system 109 into the OTT messaging application along with a text based message. In some cases, the USS identifier can be publicly associated with the external system 121, but in fact addresses the user support system 109. The OTT messaging application sends an OTT message including the USS identifier of the user support system 109 and the text based message to the OTT messaging service 107 via the connecting network.

The OTT messaging service 107 determines where to send the OTT message based on the provided USS identifier. The OTT messaging service 107 forwards the received text based message of the user 101 in an OTT message along with an anonymous identifier for the user 101 toward the user support system 109. The user support system 109 receives the OTT message from the OTT messaging service 107. Upon receiving the OTT message of the user 101 at the user support system 109, an OTT communication session can be established (2). The OTT communication session can utilize any communication protocol or process where the user is identified by an anonymous identifier (3) that is selected by the OTT messaging application 105, user 101, or OTT messaging service 107. The user support system 109 can assign a correspondent to receive and service the OTT message. The correspondent can be a user support staff member 151 or automated response instance (an algorithm using any application that is capable of processing OTT messages and responding with OTT messages to the user 101). The correspondent can return OTT messages to the user 101, where the return OTT messages include the anonymous identifier of the user 101 as the destination.

As previously described, with only the anonymous identifier, the user support system 109 cannot determine the real identifier without a user support staff 151 having to ask the user 101 for such information over the OTT communication session, which is not a secure process and does not provide a good user experience. However, as shown in FIG. 1, the user support system 109 can query an identity service 113. The identity service 113 facilitates correlation of the anonymous identifier generated by the OTT messaging service 107 for a particular user 101 with a real identifier for the user issued by the external system 121. The user support system 109 can utilize the real identifier to access the user account information 123 for the user 101. The identity service 113 is able to correlate the anonymous identifier with the real identifier of the user, while at the same time enabling the user to control this sharing of information.

In some cases, the user support system 109 can track correlations between the anonymous identifiers and real identifiers. This correlation of anonymous identifiers and real identifiers can be tracked in a database or any similar data management system. If an entry for the anonymous identifier is found in a data management system, then the user support system 109 utilizes the corresponding real identifier. The user support system 109 in these implementations has a secure connection with the external system 121 and a trusted relationship such that the user support system 109 can access user account information 123 once the real identifier for a user 101 is determined.

In the cases where the data management system does not have an entry for the anonymous identifier, then the user support system 109 can query (4) the identity service 113 by providing an anonymous identifier to the identity service 113. The identity service 113 then transforms the anonymous identifier using an encryption algorithm, hashing function or similar process to generate a secured token. The secured token has a one to one relation to the anonymous identifier that is only known to the identity service.

The secured token can be sent (5) in an OTT message over the OTT communication session toward the user electronic device 103 where the user 101 is addressed via the anonymous identifier. The OTT messaging service 107 translates the anonymous identifier into a network address and sends the OTT message from the identity service 113 to the user electronic device 103 and the user 101. In this scenario, the user support system 109 is unaware of any information about the user 101 unless the user provides personal information via the OTT messages. An OTT communication session between the user 101 and a user support staff 151 using the user support system 109 can continue as long as both the user 101 and user support staff 151 continue to utilize the OTT communication session.

The secured token is received at the user electronic device 103 by the OTT messaging application. The secured token can be stored at the user electronic device 103. The user electronic device 103 also stores the secured real identifier received from the external system 121. The secured real identifier and the secured token can be paired at the user electronic device 103 to enable a secure correlation of the real identifier and the anonymous identifier. With this pairing it is possible to correlate the user and the anonymous identifier with the real identifier. In some implementations, one, more, or all of the local applications 105 can be configured to access and pair the secured token and the secured real identifier. The pairing of the anonymous identifier and the real identifier can only be determined by the identity service 113, because the identity service 113 can decrypt or decipher both the secured token and the secured real identifier to make the pairing of the anonymous identifier and the real identifier. It is within the control of the user 101, however, when and whether to send the secured token and the secured real identifier to the identity service 113.

In some implementations, the identity service 113 requests a return of the secured token and secured real identifier. In other implementations, the secured token and secured real identifier are sent by the user electronic device 103 to the identity service 113 based upon the initiation of the user 101. In some implementations, one, more, or all of the local application 105 (e.g., the OTT messaging application, a specialized application for coordinating the secured real identifier and the secured token that communicates with the identity service 113) can facilitate this forwarding (6) of the secured real identifier and the secured token.

Once the identity service 113 receives the secured token and secured real identifier, then both the secured token and the secured real identifier can be decrypted or deciphered and the anonymous identifier and the real identifier recovered. Failure to decrypt one or both of these indicates malicious tampering or system misconfiguration that the operator of the identity service can be immediately notified of. If the secured token decrypts, the identity service 113 can also verify that the secured token has not expired. An expired secured token can also be the basis to raise an alarm to the operator as it indicates system latency/error or a kind of attack called a replay attack. A replay attack involves a malicious party intercepting another user's valid secured token and attempting to reuse it. If the secured token is validated, the identity service 113 can then share (7) the anonymous identifier and real identifier pairing with the user support system 109. In some implementations, the identity service 113 responds to the query of the user support system 109 that provided the anonymous identifier by returning the corresponding real identifier.

With the real identifier for the external system 121, the user support system 109 can access (8) the user account information 123. The user support system 109 can have a secured or trusted connection. The user support staff 151 can view the user account information 123 and utilize the information therein to answer questions and provide services to the user 101. The user support staff 151 can also update the user account information as needed to service the needs of the user 101. Thus, the user 101 is able to control the access to the user account information 123 without being connected directly to the external system 121. In this way the user support system 109 can provide improved service to the user 101 by more easily and securely accessing the user account information 123.

Figure 2:
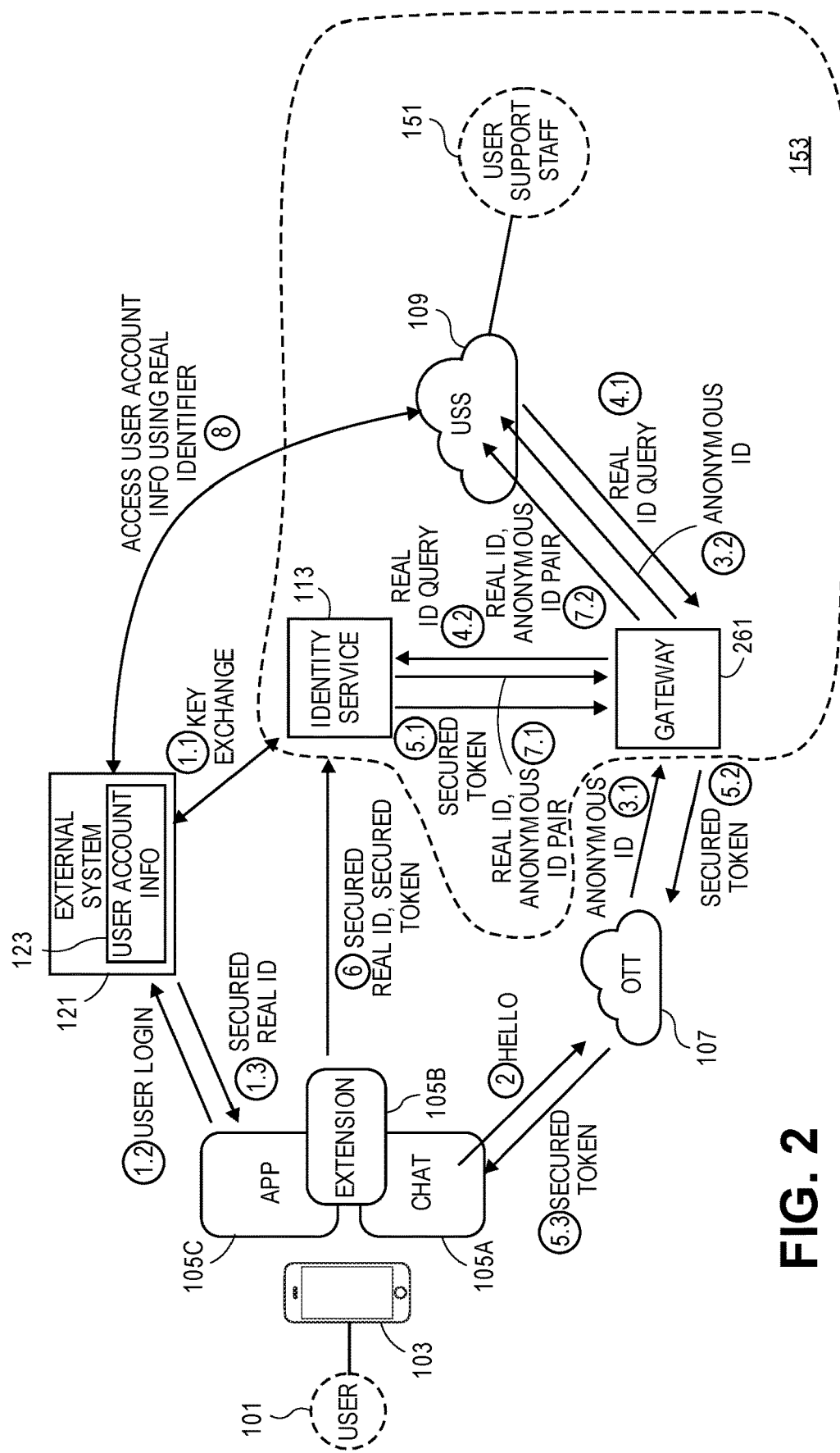
FIG. 2 is a diagram of an OTT messaging service, external system, user electronic device with an extension application, user support system and identity service according to some example implementations.

FIG. 2 is a diagram of an OTT messaging service, external system, user electronic device with an extension application, user support system and identity service according to some example implementations. FIG. 2 uses the same of similar reference numerals as FIG. 1 to refer to the same or similar parts, and the alternatives described with reference to FIG. 1 equally apply to FIG. 2 and are not repeated.

The diagram illustrates another example implementation system and process whereby a user 101 is able to provide user account information 123 to a correspondent such as the user support staff 151 via OTT messaging. In this example implementation, the user electronic device 103 executes a chat application 105A, an external service application 105C and an extension application 105B. In the illustrated example, the user electronic device 103 is a smartphone. The chat application 105A can be any application that can communicate via an OTT messaging service 107. Since the chat application 105A utilizes an OTT messaging service 107 it is an example of an OTT messaging application.

The external service application 105C enables the user 101 to access the services of the external service 121. The external system 121 exchanges (1.1) the set of one or more encryption keys with the identity service 113.

The user 101 can access the services of the external system 121 via the external service application 105C, which is in communication with the external system 121 via a network connection. The user can login (1.2) to the external system 121 to access services of the external system 121. Once successfully logged in or similarly authenticated with the external system 121, the external system 121 can provide services and access to user account information 123 to the user 101. The external system 121 can provide (1.3) the secured real identifier for the user account to the user 101 via external system application 105C. As mentioned above, the secured real identifier is an identifier of the user account that has been protected by encryption or similar process to prevent improper use of the underlying real identifier to access the user account information 123 at the external system 121. The external system 121 can encrypt the real identifier using any encryption process and can share encryption keys with other systems where a trusted relationship exists to enable those systems to decrypt the secured real identifier. In the example implementations, the user support system 109, the identity service 113, or the system 153, more generally, can be provided the decryption keys or similar information to enable decryption of the secured real identifier and access to the user account information 123. The provision of the secured real identifier to the user electronic device 103 and the provision of the keys are asynchronous to the other steps of the illustrated process and can occur at any point before pairing as discussed further herein below.

The user 101 can seek to utilize the OTT messaging service 107 to communicate with the user support system 109. The user 101 initiates a communication session (2) with the system 153 (or the user support system 109) via the chat application 105A using a publicly available address or identifier for the system 153 (or the user support system 109) or external system 121.

In response to the user 101 initiating the OTT communication session, the OTT messaging service 107 determines the location or network based address of the user support system 109 and forwards (3.1) the received text based message of the user 101 in a OTT message along with an anonymous identifier for the user 101 toward the user support system 109.

In some implementations, the system 153 includes a gateway 261 that manages and routes incoming data traffic for the system 153. The gateway 261 is a network device that routes the OTT message of the user 101 to the user support system 109. When present, the gateway 261 forwards (3.2) the OTT message with the anonymous identifier to the user support system 109. The user support system 109 receives the OTT message from the OTT messaging service 107. Upon receiving the OTT message of the user 101 at the user support system 109 an OTT communication session can be established. The OTT communication session can utilize any communication protocol or process where the user is identified by an anonymous identifier that is selected by any combination of the chat application 105A, user 101, or OTT messaging service 107.

As previously described, with only the anonymous identifier, the user support system 109 cannot determine the real identifier without a user support staff 151 having to ask the user 101 for such information over the OTT communication session, which is not a secure process and does not provide a good user experience. However, as shown in FIG. 1, the user support system 109 can query (4.1) the identity service 113. The query can be in the form of a real identifier query that is sent to the gateway 261 and then forwarded (4.2) by the gateway 261 to the identity service 113. As previously described, the identity service 113 facilitates correlation of the anonymous identifier generated by the OTT messaging service 107 for a particular user 101 with a real identifier for the user 101 issued by the external system 121. The user support system 109 can utilize the real identifier to access the user account information 123 for the user 101. As previously described, the identity service 113 is able to correlate the anonymous identifier with the real identifier of the user, while at the same time enabling the user to control this sharing of information.

In the cases where the data management system does not have an entry for the anonymous identifier, then the user support system 109 can query the identity service 113 by providing an anonymous identifier to the identity service 113. The identity service 113 then transforms the anonymous identifier using an encryption algorithm, hashing function or similar process to generate a secured token. The secured token has a one to one relation to the anonymous identifier that is only known to the identity service. The secured token is sent (5.1) to the gateway 261, which then forwards (5.2) the secured token to the OTT messaging service 107. The secured token can be sent (5.3) to the user electronic device 103 by the OTT messaging service 107 using the OTT communication session.

In some implementations, the secured token can be sent as an OTT message where the user 101 is addressed via the anonymous identifier. The OTT messaging service 107 translates the anonymous identifier into a network address and sends the OTT message from the identity service 113 to the user 101 and user electronic device 103. In this scenario, the user support system 109 is unaware of any information about the user 101 unless the user provides personal information via the OTT messages.

The secured token is received at the user electronic device 103 by the chat application 105A. The secured token can be stored at the user electronic device 103 by the chat application 105A. The external system application 105C also stores the secured real identifier received from the external system 121. The secured real identifier and the secured token can be paired at the user electronic device 103 to enable a secure correlation of the real identifier and the anonymous identifier. In some implementations, the extension application 105B performs this pairing and manages communication (6) with the identity service 113. With this pairing it is possible for the identity service 113 to correlate the user 101 and the anonymous identifier with the real identifier. The pairing of the anonymous identifier and the real identifier can only be determined by the identity service 113 because the identity service 113 can decrypt or decipher both the secured token and the secured real identifier to make the pairing of the anonymous identifier and the real identifier. It is within the control of the user 101, however, when and whether to send the secured token and the secured real identifier to the identity service 113.

As mentioned above, if the secured token failed to decrypt, then the operator of the identity service 113 can be immediately notified. If the secured token decrypts, the identity service 113 can also verify that the secured token has not expired.

The extension application 105B can retrieve the secured token and the secured real identifier from storage locations in the user electronic device 103 or by querying the chat application 105A and external service application 105C or any combination thereof. The extension application 105B can receive a query from the identity service 113 for the secured real identifier and secured token or can be prompted by user 101 interaction with the extension application 105B to send this information to the identity service 113. The secured token and secured real identifier can be sent together or separately to the identity service 113 using any protocol or communication mechanism. In some implementations, the extension application 105B sends the secured token and secured real identifier to the identity service 113 via the gateway 261 or other intermediate components.

As previously described, once the identity service 113 receives the secured token and secured real identifier, then both the secured token and the secured real identifier can be decrypted or deciphered and the anonymous identifier and the real identifier recovered. The identity service 113 can then share the anonymous identifier and real identifier pairing with the user support system 109. In some implementations, the identity service 113 responds to the query of the user support system 109 that provided the anonymous identifier by returning the corresponding real identifier. The real identifier can be sent (7.1) to the gateway 261. The gateway 261 can then forward (7.2) the real identifier to the user support system 109 (and optionally the user support staff 151).

With the real identifier for the external system 121, the user support system 109 can access (8) the user account information 123. The correspondent (e.g., user support staff 151) can then utilize the user account information 123 to answer questions and provide services to the user 101 via the OTT communication session. The correspondent (e.g., user support staff 151) can also update the user account information 123 as needed to service the needs of the user 101. Thus, the user 101 is able to control the access to the user account information 123 without being connected directly to the external system 121. In this way the user support system 109 can provide improved service to the user 101 by more easily and securely accessing user account information 123.

Figure 3:
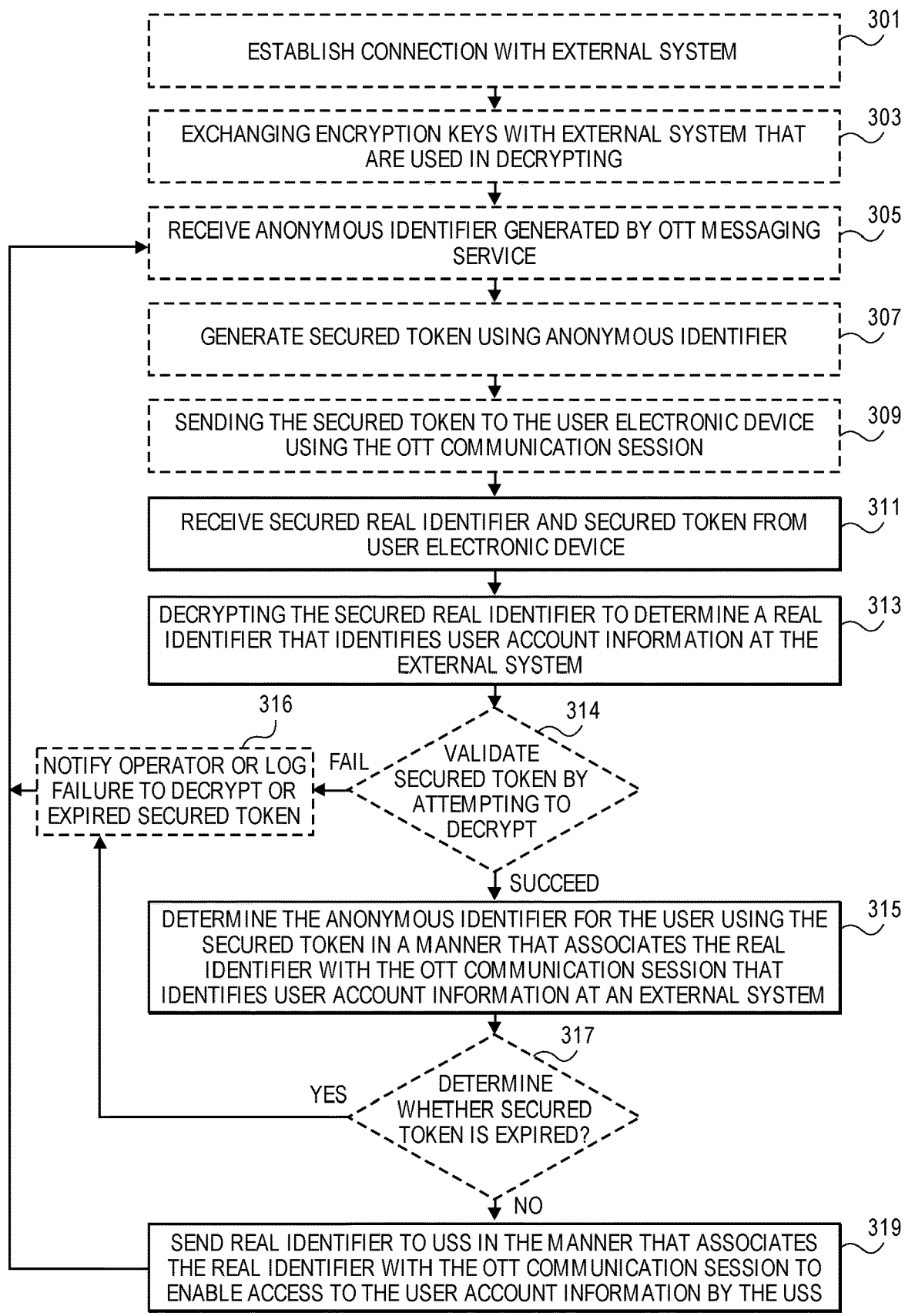
FIG. 3 is a flowchart of a process of an identity service according to some example implementations.

FIG. 3 is a flowchart of a process of an identity service according to some example implementations. The operations of the identity service 113 are described in reference to the example implementations of FIGS. 1 and 2. The process of the identity service 113 initiates by establishing a communication connection with the external system 121 (Block 301). The communication connection can be a secured connection that enables secure communication between the external system and the identity service. The communication connection can be over any network or communication medium. The identity service 113 exchanges a set of encryption keys with the external system 121 that are to be used to decrypt secure real identifiers (as described herein below) (Block 303). In other implementations, the exchange of encryption keys may be conducted in other ways (e.g., via a non-secure connection, through one or more intermediaries, by the physical transfer of a machine-readable storage medium that stores the keys, etc.). The identity service 113 can store the received encryption keys from the external system 121 in a data management system or similar storage system that associates the received encryption keys with the external system 121.

The identity service 113 will use the keys to service queries for the resolution of anonymous identifiers for users that may have an account (with which is associated user account information 123) with the external system 121. The identity service 113 can receive such a query to resolve the anonymous identifier from, for example, the user support system 109 (Block 305). The query includes the anonymous identifier that has been generated by the OTT messaging service 107 responsive to the user electronic device 103 causing the establishment of an OTT communication session as previously described.

In response to receiving the query with the anonymous identifier, the identity service 113 generates a secured token using the anonymous identifier (Block 307). Any encryption, ciphering, hashing or similar transformation algorithm can be utilized to generate the secured token, such that the anonymous identifier can be determined with a process to reverse the process to obtain the anonymous identifier with a high level of reliability. In some implementations, the transformation process and reverse transformation process are utilized to create a stateless system whereby the relationship of the anonymous identifier with the secured token does not need to be tracked or stored in a data management system by the identity service 113. In other implementations, a non-reversible transformation can be utilized and the relationship of the anonymous identifier and the secured token can be tracked in a database management system. In further embodiments, the generation of a secured token can be carried out by other components of the system 153 using a process or algorithm that the identity service 113 can reverse to transform a secured token back into an anonymous identifier.

The secured token can then be sent to the user 101 via the OTT messaging service 107 (Block 309). The secured token can be sent to the user 101 in an OTT message (the secured token is sent toward the OTT message service 107 in a way that causes the OTT messaging service 107 to forward it to the user—e.g., sending it over the open OTT communication session with the user, including in the OTT message the anonymous identifier, etc.) or through a similar communication mechanism. The secured token can then be stored at the user electronic device 103. The user electronic device 103 and the local applications 105 executed by the user electronic device 103 can pair the secured token with a secured real identifier. Pairing can be based on the presence of the secured token and secured real identifier at the user electronic device 103, storage of the secured token and secured real identifier in locations associated with a user profile on the user electronic device 103 or similar criteria. In some implementations, it is up to the user whether to cause the local applications 105 to send the secured token and secured real identifier to the identity service 113 (e.g., the local applications 105 may provide a prompt to the user requesting whether the user authorizes the sending of this information). Different implementations may rely on different triggers for this process (e.g., the user electronic device 103 pairing the secured token and secured real identifier, and the identity service 113 sending a query or code to the user electronic device 103). The identity service 113 then receives the secured token and secured real identifier from the user electronic device 103 (Block 311). As discussed further below, the secured token and secured real identifier may be sent responsive to a user 101 selecting to self-identify to the user support system 109. Once the identity service 113 receives the secured token and the secured real identifier, then the identity service 113 can decrypt, decipher, or similarly transform the secured token and the secured real identifier to determine the anonymous identifier and the real identifier (Blocks 313 and 315). The real identifier can be obtained using the encryption keys of the external system 121. As mentioned above, the secured token can be transformed or looked up in a local database management system to obtain the anonymous identifier. In any case, the resulting real identifier and anonymous identifier are thereby paired such that providing the pair or the resulting real identifier in response to a query for this anonymous identifier conveys this pairing to the user support system 109. Determining the real identifier and the anonymous identifier in this way enables the identity service 113 to send the real identifier to the user support system in a manner that associates the real identifier with the OTT communication session.

In some implementations, before sending the real identifier or pair to the user support system 109, a check can be performed to determine whether the secured token can be decrypted (Block 314) and whether it has expired (Block 317). A secured token can be given a time to live (TTL) or similar indicator to indicate the age of the secured token that is either internal or external to the secured token. If the secured token is expired or is invalid, this incident should be logged for analysis (Block 316). It can then be discarded and the process can continue to await a next query with an anonymous identifier (Block 305).

If the secured token has not expired, then the real identifier can then be sent (Block 319) to the user support system 109 (e.g., as a response to the received query that included the anonymous identifier). In some implementations, the anonymous identifier can also be provided to the user support system 109. As mentioned above, providing the real identifier or the pairing in this manner enables the user support system 109 to correlate the OTT communication session with the user 101 with the user account information 123 at the external system 121.

Figure 4:
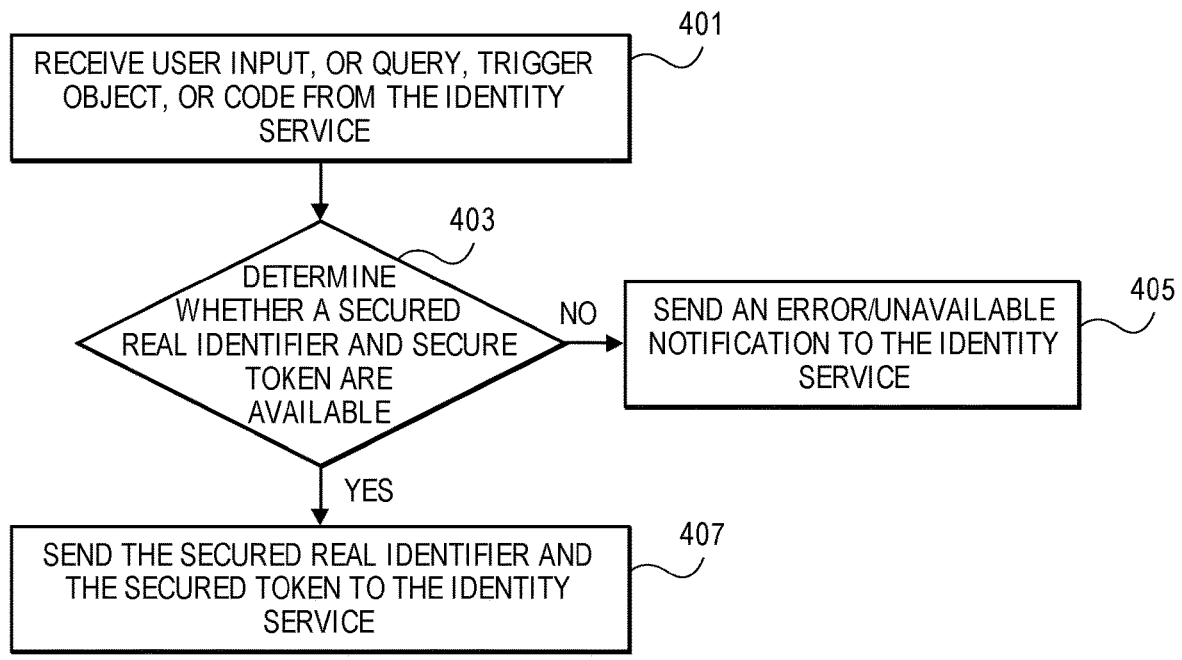
FIG. 4 is a flowchart of a process of an extension application according to some example implementations.

FIG. 4 is a flowchart of a process of an extension application 105B according to some example implementations. The extension application 105B can be utilized in some implementations to facilitate the pairing of the secured token and the secured real identifier. The extension application 105B operation can be triggered by a number of different inputs or actions dependent on the implementations (Block 401). For example, the extension application 105B can be triggered by one or more of: 1) receipt of the secured token by one of the local applications 105, such as chat application 105A; 2) user 101 activation; 3) receipt of a query, trigger object or code from the identity service 113, where the trigger object or code can be a data structure or executable sent by the identity service 113.

The extension application 105B responds to these triggers by checking to determine whether a secured token and secured real identifier are present at the user electronic device 103 (Block 403). The extension application 105B can check known local storage locations for this information, query other local applications 105 or similarly locate the secured token and secured real identifier. If the secured token and secured real identifier are not both found, then an error can be generated (Block 405). Dependent on the implementation: 1) the error can be presented to the user 101 to indicate what data is missing and potentially prompting the user with information as to how to obtain this information (e.g., log into the external system 121 to get the secured real identifier); and/or 2) the error can be sent to the identity service 113 to indicate whether the secured token and/or the secured real identifier are missing. In cases where both items are present in the system, then the extension application 105B sends the secured token and the secured real identifier to the identity services 113 (Block 407). The initial query, input, trigger object or code can indicate which anonymous identifier and external system are to be matched by the extension application. In other implementations, the external application can present a user with a set of options as to the available open OTT communication sessions and external systems to be matched.

Figure 5:
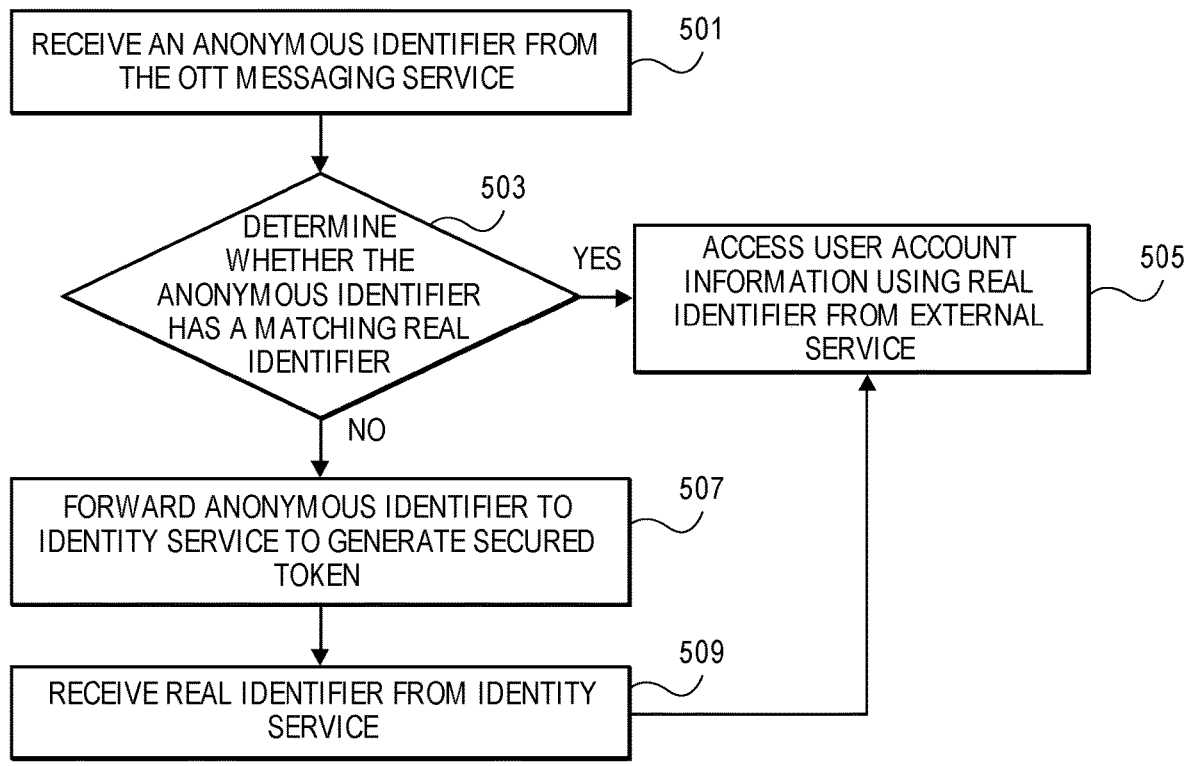
FIG. 5 is a flowchart of a process of a user support system according to some example implementations.

FIG. 5 is a flowchart of a process of a user support system according to some example implementations. The user support system 109 can respond to and handle interfacing with the OTT messaging services 107, including supporting OTT communication sessions. As previously described, the user electronic device 103, through the OTT message service 107, can establish an OTT communication session with the user support system 107. As a result, the user support system 107 will receive the anonymous identifier assigned by the OTT message service 107 via an OTT message or similar message (Block 501). The user support system 107 can involve a correspondent as previously described to service the user.

The user support system 109 determines whether the anonymous identifier that has been received corresponds to a known real identifier (Block 503). In cases where the user 101 has previously connected with the user support system 109, then the anonymous identifier may already be known and a real identifier supplied. For example, a user 101 may have lost network connection and re-established an OTT communication session with the user support system 109. In such cases, the user support system 109 can look-up the anonymous identifier in a database management system and obtain the real identifier for the user. The user support system can then use the real identifier to access user account information 123 in the external system 121 (Block 505).

In cases where the anonymous identifier is not known, then the user support system 109 forwards the anonymous identifier to the identity service to generate a secured token 113 (Block 507). In some implementations, this takes the form of the user support system 109 generating a query and sending it to the identity service 113 to request a real identifier for a user 101. The query includes the anonymous identifier. In response, if the identity service 113 has the real identifier for the user 101 or can get it via the above discussed flow, the identity service 113 sends the requested real identifier (Block 509). The user support system can then use the real identifier to access the user account information 123 in the external system 121 (Block 505) and thereby provide services to the user 101. Thus, as part of the OTT communication sessions, the user support system 109 can receive anonymous identifiers for users and initiate a process to obtain a real identifier for those users to enable access to their user account information with an external service 121.

Figure 6:
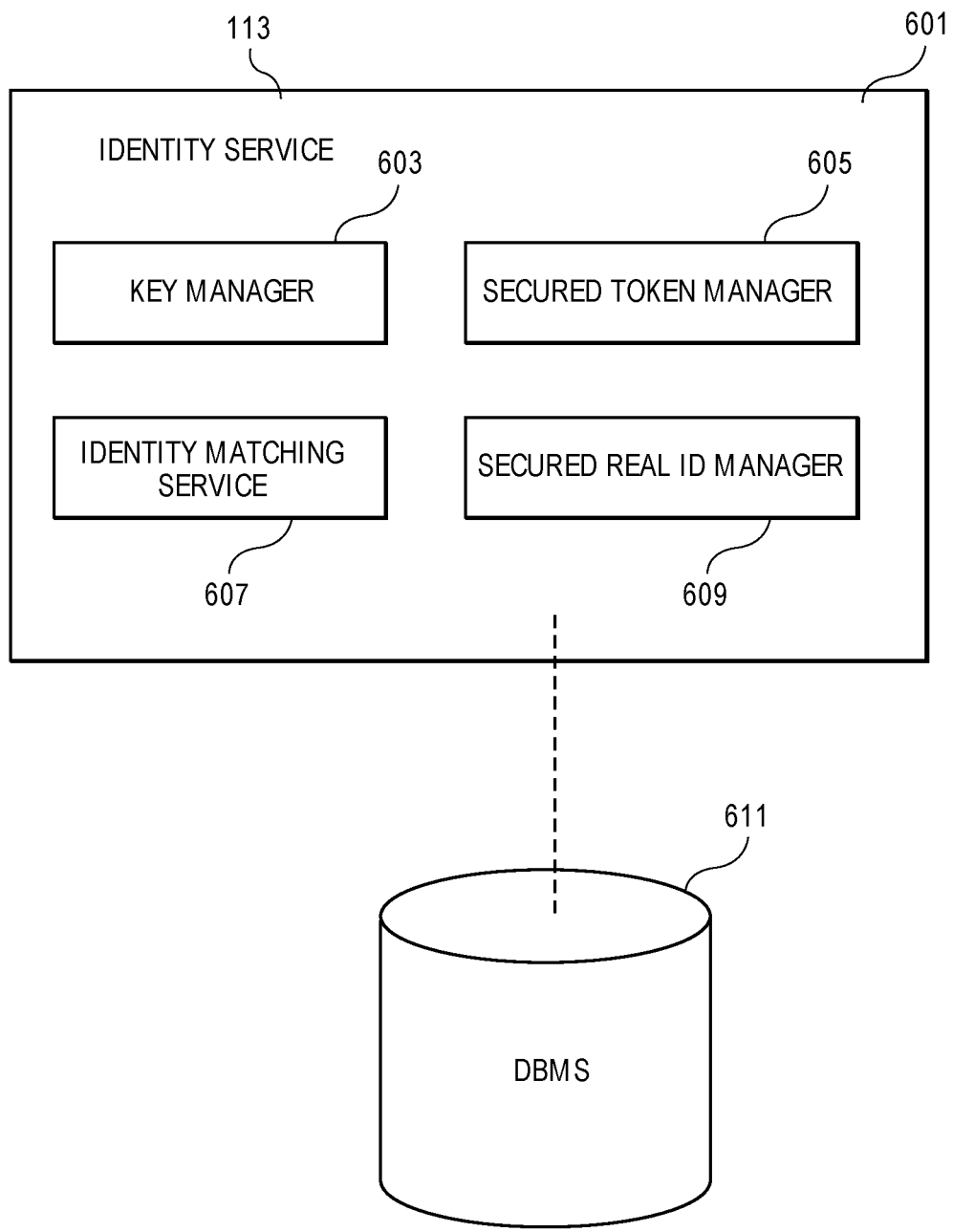
FIG. 6 is a diagram of an identity service according to some example implementations.

FIG. 6 is a diagram of an electronic device to implement an identity service or identity service extension according to some example implementations. The identity service 113 can be implemented by any number or combination of electronic devices. The identity service encompasses a set of functional components including a key manager 603, secured token manager 605, secured real identifier manager 609, an identity matching service and similar components. In some implementations, the identity service 113 interfaces with a database management system (DBMS) 611 that stores anonymous identifiers, secure tokens, real identifiers, and/or inter-relationships between these types of data.

The key manager 603 can implement the exchange of keys with external systems 121 as well as the storage and tracking of these keys. The exchanged keys can be stored in the DBMS 611 or similarly tracked. The key manager 603 can also provide cryptographic keys to other components to enable encryption and decryption of real identifiers and anonymous identifiers. The key manager 603 can support the use of any type of cryptographic key or keys utilized for any type of ciphering system.

The identity matching service 607 can manage incoming queries or requests to resolve anonymous identifiers as well as communication with extension applications 105B to obtain secured token and secured real identifier pairs from user electronic devices 103. The identity matching service 607 can also manage the correlation of anonymous identifiers with real identifiers based on received secured token and secured real identifier pairs from user electronic devices 103. The identity matching services can reply to queries to resolve anonymous identifiers from user support systems 109 and similar systems.

The secured token manager 605 can receive anonymous identifiers from the identity matching system 607 that were generated by OTT messaging services 107. The anonymous identifiers can be received as queries from user support systems 109. The secured token manager 605 can encrypt, hash, or similarly transform received anonymous identifiers into secured tokens. The secured tokens can be provided to the identity matching services 607. Additionally, or alternatively, the secured token manager 605 can handle the transmission of the secured token to the user 101 over the OTT messaging service 107.

The secured real identifier manager 609 can receive secured real identifiers from the identity matching service 607 or user electronic device 103. The secured real identifier manager 607 can decrypt or decipher the secured real identifier to obtain the real identifier using keys provided by the external system 121 and managed by the key manager 603. The decrypted or deciphered real identifier can then be provided to the user support system 109 or identity matching service 607. The real identifier can then be utilized by the user support system to access user account information 123 for a user 101.

Additional Detail

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Over the top (OTT) is a term that refers to content distribution technology where a content provider, such as an audio, video, messaging, or similar content provider, transfers the content over the Internet or similar communication network directly to a user electronic device. This distribution technology bypasses service provider control and service provider services that generally seek to manage content distribution over their networks. Service providers include telecommunication network (e.g., cellular networks) operators, cable network operators and similar network access service providers. OTT can be utilized for different types of content including OTT television, OTT voice calling, and OTT messaging.

OTT messaging is a term that describes various types of messaging services that are not provided or directly supported by service providers. These messaging services can include instant messaging services that provide immediate communication mechanisms between users and between users and various types of third party services (i.e., services not provided by a service provider). OTT messaging can be considered as an alternative to short message service (SMS) communications provided by cellular network operators. OTT messaging can be provided by dedicated applications (Apps) on smartphones and similar devices. OTT messaging can be text based messaging and may also support video and audio communication in combination with the text based messaging.

Cloud computing services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Customer relationship management (CRM) is a term that refers to practices, strategies, and technologies that companies/vendors use to manage and analyze customer interactions and data throughout the customer lifecycle, with the goal of improving business relationships with customers, assisting in customer retention, and driving sales growth. A CRM system is designed to compile information about customers across different channels (e.g., points of contact between the customer and the company such as the company's website, telephone, live chat, direct mail, marketing materials, and social media to name a few examples). A CRM system can also give customer-facing staff detailed information about a particular customer's personal information, purchase history, buying preferences, and concerns.

As used herein, the term multi-tenant database management system (DBMS) refers to those systems in which various elements of hardware and software of the database management system may be shared by one or more tenants. For example, a given server may simultaneously process requests for a great number of tenants, and a given database table may store records for a potentially much greater number of tenants.

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

While the exemplary implementations may include an on-demand database service environment provided by an application server with a front end for an on-demand database service capable of supporting multiple tenants, alternative implementations are within the spirit and scope of the appended claims (e.g., other database architectures may be used, such as ORACLE® or DB2® by IBM).

A "user profile" or "user's profile" is generally configured to store and maintain data about a given user referred to as "user account information" 123. The data can include general information, such as name, title, phone number, a photo, a biographical summary, and a status, e.g., text describing what the user is currently doing. The data can include messages created by other users. The data can include information related to a set of services provided by an external system 121, such as billing information, schedules, and similar information.

Exemplary Electronic Devices

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 7A:
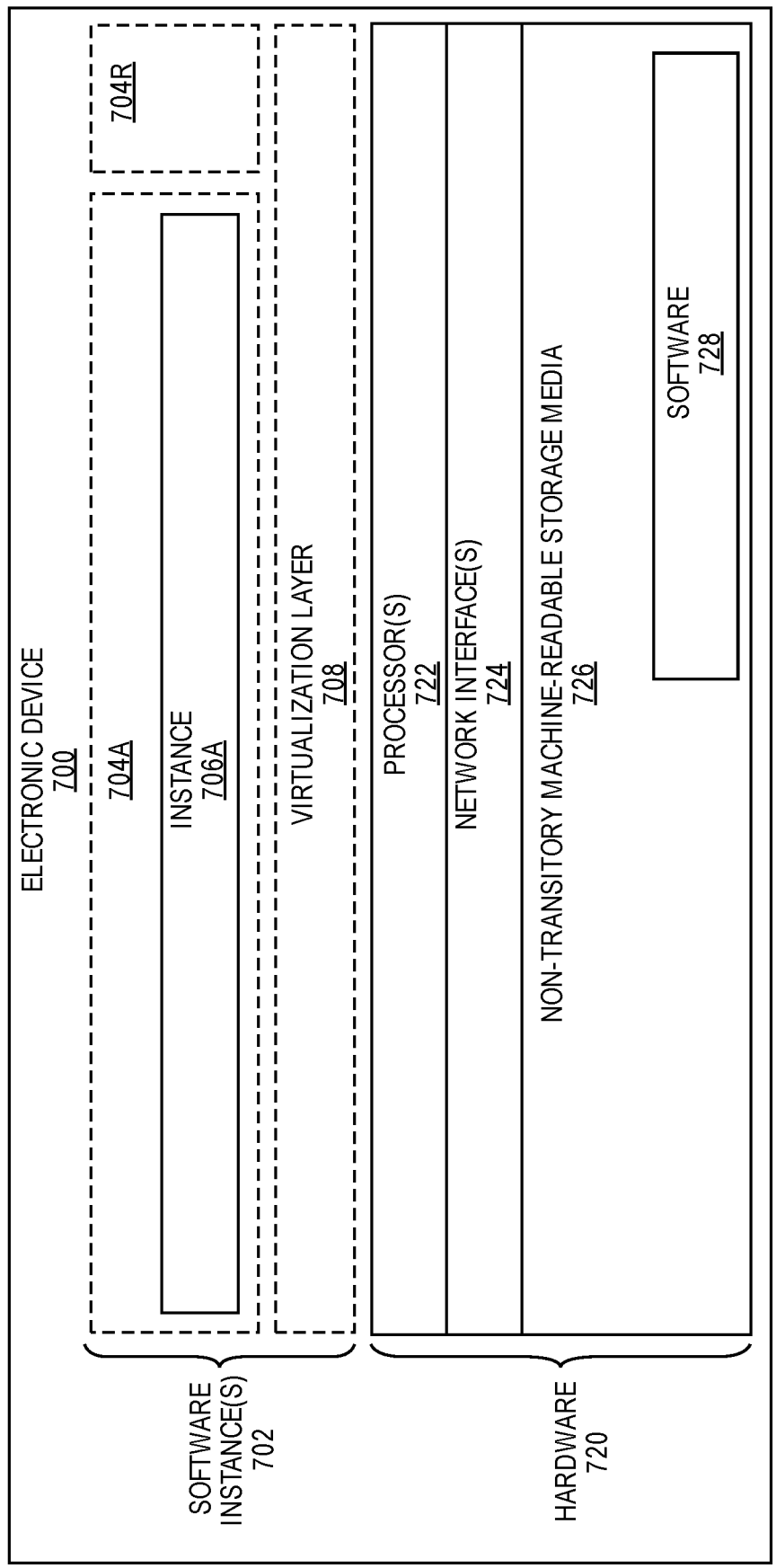
FIG. 7A is a diagram of an electronic device to implement an identity service or extension application according to some example implementations.

FIG. 7A is a block diagram illustrating an electronic device 700 according to some example implementations.

FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described user support system 109, extension application 105B, identity service 113, and external system 121 may be implemented in one or more electronic devices 700. In one implementation: 1) the local application(s) 105 are implemented in user electronic devices operated by users and implement an interface with the external system 121 (e.g., the local application 105C), the identity service 113 (e.g., the extension application 105B), and the user support system 109 (e.g., the local application 105A through the OTT message service 107), and they can be implemented in combination with other technologies and services (e.g., a web browser, a native client, a portal, a command-line interface, and/or an application program interface (API) based upon protocols such as Simple Object Access Protocol (SOAP), Representational State Transfer (REST), etc.)); and 2) the identity service 113 and user support system 109 are implemented in a set of one or more of the electronic devices 700 (e.g., a set of one or more server electronic devices where the identity service 113 and user support system 109 represent the software to implement the identity service 113 or user support system 109); and 3) in operation, the electronic devices implementing the described user support system 109 and identity service 113 would be communicatively coupled (e.g., by a network) and would establish (or through one or more other layers) the connections for exchanging the appropriate information with the external system 121 and the user electronic device 103 as described herein above. Other configurations of electronic devices may be used in other implementations (e.g., an implementation in which the identity service 113 is operated by a different entity and/or implemented on a separate and independent set of one or more electronic devices 700 than the user support system 109).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). The gateway 261 can be implemented by or incorporate one or more network devices.

Exemplary Environment

Figure 7B:
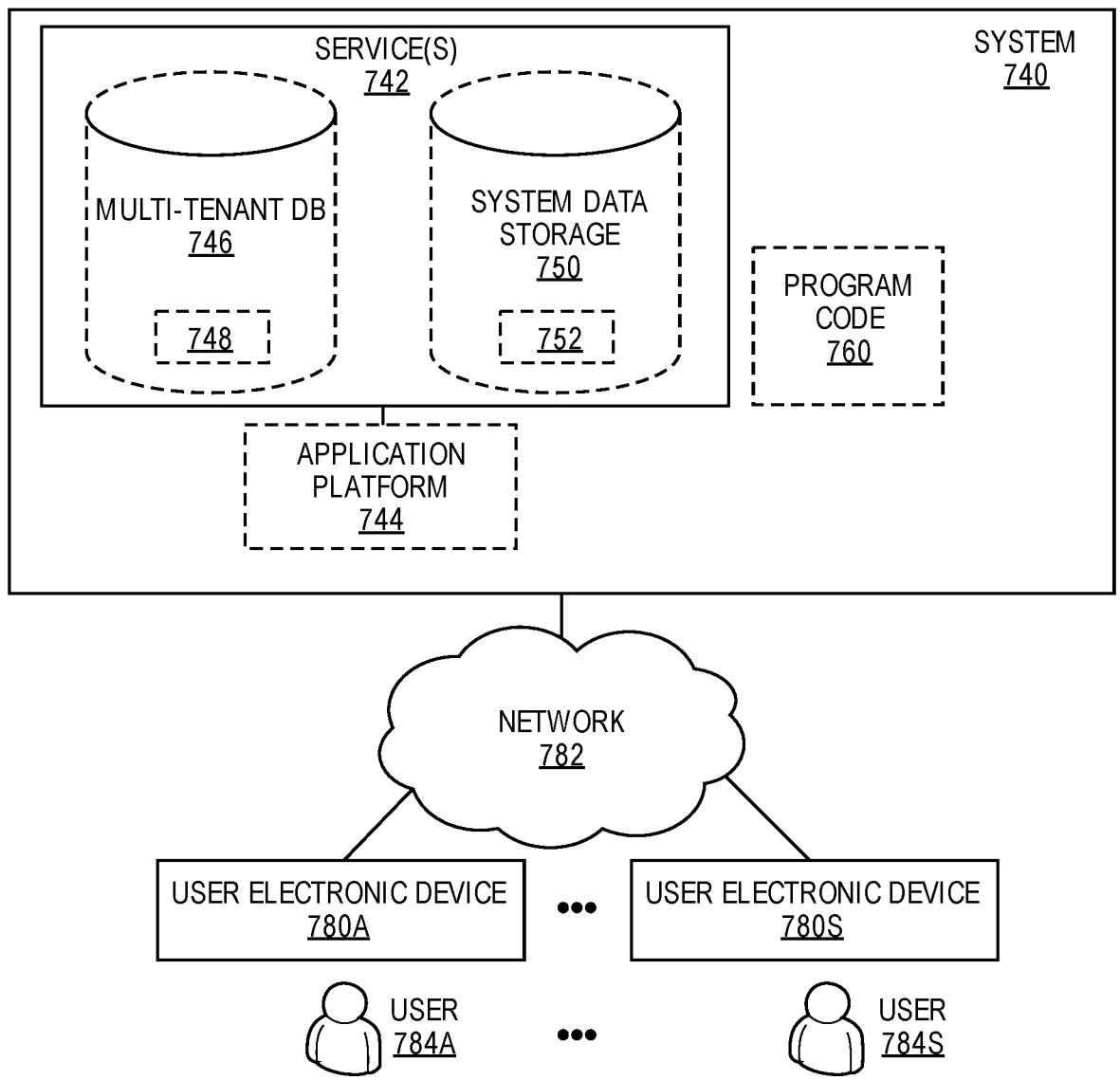
FIG. 7B is a diagram of a system to implement a user support system according to some example implementations.

FIG. 7B is a block diagram of an environment where an identity service 113 and/or user support system 109 may be deployed, according to some implementations. The system 153 can be in some implementations a system 740. A system 740 includes hardware (a set of one or more electronic devices) and software to provide service(s) 742, including the identity service 113 and/or user support system 109. The system 740 is coupled to user electronic devices 780A-S over a network 782. The service(s) 742 may be on-demand services that are made available to one or more of the users 784A-S working for one or more other organizations (sometimes referred to as outside users) so that those organizations do not need to necessarily be concerned with building and/or maintaining a system, but instead makes use of the service(s) 742 when needed (e.g., on the demand of the users 784A-S). The service(s) 742 may communicate with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services, such as a customer relationship management (CRM) service (e.g., Sales Cloud by salesforce.com, Inc.), which is an example implementation of the user support system 109, as mentioned above, a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 740 via one or more of user electronic devices 780A-S.

In some implementations, one or more of the service(s) 742 may utilize one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the identity service 113 or user support system 109, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages, and applications available to it from system 740 over network 782.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method to enable a user to self-identify to a user support system when a user electronic device is connected to the user support system by an over-the-top (OTT) communication session where an OTT messaging service provides an anonymous identifier to the user support system to enable communication with the user, the method comprising:
   receiving, at the identity service, a secured real identifier and a secured token from the user electronic device in response to a user selection to self-identify to the user support system;
   decrypting, at the identity service, the secured real identifier to determine a real identifier that identifies user account information at an external system;
   determining, at the identity service, the anonymous identifier for the user using the secured token to enable the identity service to send the real identifier to the user support system in a manner that associates the real identifier with the OTT communication session;
   sending, by the identity service, the real identifier to the user support system in the manner that associates the real identifier with the OTT communication session to enable access to the user account information by the user support system;
   prior to receipt of the secured real identifier and the secured token, performing the following,
      receiving, at the identity service, the anonymous identifier, and
      causing, by the identity service, the secured token to be sent to the user electronic device using the OTT communication session, and
   prior to receipt by the identity service of the anonymous identifier, performing the following,
      receiving, by the user support system, the anonymous identifier from the OTT messaging service,
      sending, by the user support system, the anonymous identifier to the identity service; and
   accessing, by the user support system, the user account information at the external system responsive to receipt of the real identifier sent by the identify service.

2. The method of claim 1, further comprising:
exchanging with the external system encryption keys that are used in the decrypting.

3. The method of claim 1, further comprising:
generating, by the identity service, the secured token using the anonymous identifier.

4. The method of claim 1, further comprising:
determining, by the user support system, whether the anonymous identifier has a matching real identifier in a database management system; and
forwarding the anonymous identifier to the identity service to generate the secured token, in response to the anonymous identifier not having a match in the database management system.

5. The method of claim 1, further comprising:
sending, by the identity service, an object or code to trigger an extension application on the user electronic device to cause the extension application to send the secured real identifier and the secured token to the identity service.

6. The method of claim 1, further comprising:
validating the secured token by attempting to decrypt the secured token;
determining that the secured token has not expired before the sending of the real identifier to the user support system; and
notifying an operator or logging a failure to decrypt or an expired secured token.

7. A non-transitory machine-readable storage medium that provides instructions that, if executed by a processor, will cause said processor to perform operations to enable a user to self-identify to a user support system when a user electronic device is connected to the user support system by an over-the-top (OTT) communication session where an OTT messaging service provides an anonymous identifier to the user support system to enable communication with the user, the operations comprising:
   receiving, at the identity service, a secured real identifier and a secured token from the user electronic device in response to a user selection to self-identify to the user support system;
   decrypting, at the identity service, the secured real identifier to determine a real identifier that identifies user account information at an external system;
   determining, at the identity service, the anonymous identifier for the user using the secured token to enable the identity service to send the real identifier to the user support system in a manner that associates the real identifier with the OTT communication session;
   sending, by the identity service, the real identifier to the user support system in the manner that associates the real identifier with the OTT communication session to enable access to the user account information by the user support system;

prior to receipt of the secured real identifier and the secured token, performing the following,
    receiving, at the identity service, the anonymous identifier, and
    causing, by the identity service, the secured token to be sent to the user electronic device using the OTT communication session, and
prior to receipt by the identity service of the anonymous identifier, performing the following,
    receiving, by the user support system, the anonymous identifier from the OTT messaging service,
    sending, by the user support system, the anonymous identifier to the identity service; and
    accessing, by the user support system, the user account information at the external system responsive to receipt of the real identifier sent by the identify service.

8. The non-transitory machine-readable medium of claim 7, the operations further comprising:
    exchanging with the external system encryption keys that are used in the decrypting.

9. The non-transitory machine-readable medium of claim 7, the operations further comprising:
    generating, by the identity service, the secured token using the anonymous identifier.

10. The non-transitory machine-readable medium of claim 7, the operations further comprising:
    determining, by the user support system, whether the anonymous identifier has a matching real identifier in a database management system; and
    forwarding the anonymous identifier to the identity service to generate the secured token, in response to the anonymous identifier not having a match in the database management system.

11. The non-transitory machine-readable medium of claim 7, the operations further comprising:
    sending, by the identity service, an object or code to trigger an extension application on the user electronic device to cause the extension application to send the secured real identifier and the secured token to the identity service.

12. The non-transitory machine-readable medium of claim 7, the operations further comprising:
    validating the secured token by attempting to decrypt the secured token;
    determining that the secured token has not expired before the sending of the real identifier to the user support system; and
    notifying an operator or logging a failure to decrypt or an expired secured token.

13. An apparatus comprising:
    an electronic device comprising:
        a non-transitory machine-readable medium having stored therein an identity service, to enable a user to self-identify to a user support system when a user electronic device is connected to the user support system by an over-the-top (OTT) communication session where an OTT messaging service provides an anonymous identifier to the user support system to enable communication with the user, and the user support system; and
        a processor coupled to the non-transitory machine-readable medium, wherein the processor executes the identity service and the user support system, the identity service to receive a secured real identifier and a secured token from the user electronic device in response to a user selection to self-identify to the user support system, to decrypt the secured real identifier to determine a real identifier that identifies user account information at an external system, to determine the anonymous identifier for the user using the secured token to enable the identity service to send the real identifier to the user support system in a manner that associates the real identifier with the OTT communication session, and to send the real identifier to the user support system in the manner that associates the real identifier with the OTT communication session to enable access to the user account information by the user support system, prior to receipt of the secured real identifier and the secured token, the identity service to receive the anonymous identifier, and cause the secured token to be sent to the user electronic device using the OTT communication session, and prior to receipt by the identity service of the anonymous identifier, the user support system, receives the anonymous identifier from the OTT messaging service, and sends the anonymous identifier to the identity service, and the user support system accesses the user account information at the external system responsive to receipt of the real identifier sent by the identify service.

14. The apparatus of claim 13, wherein the identity service is further to, prior to receipt of the secured real identifier and the secured token, receive the anonymous identifier, and cause the secured token to be sent to the user electronic device using the OTT communication session.

15. The apparatus of claim 14, wherein the identity service is further to generate the secured token using the anonymous identifier.

16. The apparatus of claim 13, wherein the identity service is further to send an object or code to trigger an extension application on the user electronic device to cause the extension application to send the secured real identifier and the secured token to the identity service.

* * * * *